(12) United States Patent
Bradley, Jr. et al.

(10) Patent No.: US 6,178,770 B1
(45) Date of Patent: Jan. 30, 2001

(54) ICE-ON-COIL THERMAL STORAGE APPARATUS AND METHOD

(75) Inventors: Wilson E. Bradley, Jr., Ellicott City; Richard P. Merrill, Columbia; George R. Shriver, Sykesville, all of MD (US)

(73) Assignee: Evapco International, Inc., Wilmington, DE (US)

( * ) Notice: Under 35 U.S.C. 154(b), the term of this patent shall be extended for 0 days.

(21) Appl. No.: 09/176,923

(22) Filed: Oct. 22, 1998

(51) Int. Cl.$^7$ .................................................. F25D 17/02

(52) U.S. Cl. .............................. 62/434; 62/430; 165/172; 165/236

(58) Field of Search ................................ 62/434, 430, 59; 165/177, 163, 150, DIG. 348, 236, 237, 172, 10

(56) References Cited

U.S. PATENT DOCUMENTS

| | | |
|---|---|---|
| 2,056,970 | 10/1936 | Leopold . |
| 3,197,975 | 8/1965 | Boling . |
| 3,484,805 | 12/1969 | Lorenz . |
| 3,885,936 | * 5/1975 | Limebeer ............................ 62/304 |
| 4,192,146 | 3/1980 | Credé . |
| 4,294,078 | 10/1981 | MacCracken . |
| 4,403,645 | 9/1983 | MacCracken . |
| 4,609,036 | 9/1986 | Schrader . |
| 4,616,390 | 10/1986 | MacCracken . |
| 4,671,347 | 6/1987 | MacCracken . |
| 4,755,331 | * 7/1988 | Merrill et al. ...................... 261/153 |
| 4,831,831 | 5/1989 | Carter et al. . |
| 5,355,946 | * 10/1994 | Wei et al. ........................... 165/172 |
| 5,425,414 | 6/1995 | Bradley, Jr. et al. . |
| 5,596,877 | 1/1997 | Morrison . |
| 5,598,720 | 2/1997 | MacCracken et al. . |
| 5,649,431 | 7/1997 | Schroeder, Jr. . |
| 5,680,898 | * 10/1997 | Rafalovich et al. ................ 165/236 |

OTHER PUBLICATIONS

Evapco, Inc. Brochure entitled "Ice–Pak Coils (Quality Coils Designed for Ice Storage Systems)," Bulletin 401B, pp. 1–12 (1988);.

Continental Equipment Corp. Brochure entitled "Latent Heat Storage Units or Ice Builders," B39 Catalog, Cover page and 5 pages (1982);.

Sullair, Concept Brochure entitled "HVAC & ICE," Cover page and 9 pages (1990);.

Baltimore Aircoil Company Bulletin S150/1–OBA, entitled "Ice Chiller® Thermal Storage Products for Use with Glycol Chillers," Cover Sheet and 24 pages, (Jan. 1995);.

(List continued on next page.)

*Primary Examiner*—Corrine McDermott
*Assistant Examiner*—Chen-Wen Jiang
(74) *Attorney, Agent, or Firm*—Akin, Gump, Strauss, Hauer, & Feld, L.L.P.

(57) ABSTRACT

An increased capacity thermal storage apparatus for forming frozen storage liquid during a storage cycle is provided. The apparatus comprises a container for holding a pool of storage liquid. A coil assembly having a plurality of tubes is immersed in the pool storage liquid. The tubes are adapted to transport a refrigerant therethrough to create a tubular envelope of frozen storage liquid around each tube during the storage cycle. Each tube has a non-circular cross-section with a horizontal dimension and a vertical dimension. The vertical dimension is greater than or equal to the horizontal dimension. The tubes are oriented generally horizontally and are arranged in a plurality of spaced apart, generally vertical rows. Neighboring tubes in adjacent vertical rows are horizontally spaced apart sufficiently such that unfrozen, generally vertical passageways remain between the envelopes of frozen storage liquid. The envelope of frozen storage liquid on each tube conforms to the non-circular cross-section of the tube to increase packing efficiency of the frozen storage liquid per unit volume of available space for frozen storage liquid around the coil assembly.

18 Claims, 9 Drawing Sheets

OTHER PUBLICATIONS

Baltimore Aircoil Company Bulletin S155/1–OBA, entitled "Ice Chiller Thermal Storage Units," Cover Sheet and 7 pages (1997);.

Calmac Manufacturing Corporation Bulletin entitled "An Introduction to Ice Bank Sotred Cooling Systems for Commercial Air Conditioning Applications," W.G. Dockendorf, Inc. , Ed., 6 pages (1982);.

York International Corporation, Applied Systems, Brochure entitled "York® ICEPAK™ SC—Self Contained Thermal Storage System," Form 175.00–EG1, Cover Sheet and pp. 10–14 (1988);.

FAFCO,Inc. Brochure P/N 06438 entitled "IceStor™—Advanced Technology Cool Storage Systems," Cover Sheet and 6 pages (1997).

Perma–Pipe Brochure entitled "On the Job with Perma–Ice™," vol. 2, #1, 4 pages, (1985);.

Perma–Pipe Brochure entitled "Bundles of Ice That Save You Bundles of Money," 3 pages (1987);.

Chester–Jensen Company Catalog entitled "Air Agitated Ice Builders," Catalog Section M, Cover Sheet, pp. M1–M7 & 1 additional page (1983).

* cited by examiner

ICE-ON-COIL THERMAL STORAGE APPARATUS AND METHOD

BACKGROUND OF THE INVENTION

This invention relates to a thermal storage unit for use in a cooling process, and more particularly, to an improved ice-on-coil thermal storage apparatus and a method for utilizing ice which is formed and stored in a vessel during time periods when cooling demand is low.

During the summer months, cooling contributes approximately 35% of the electric demand in many areas of the United States. Unlike typical loads on the electric utility generating resources, cooling incurs a peak demand for only a few days or weeks each year. However, during these peak demand periods electric utilities often cannot meet the total demand, and many have adopted usage and demand sensitive billing systems. In this type of system, electricity rates are more expensive during the hottest hours of the day when demand is the greatest than in the evening hours. In some case, the high daily usage period is used to determine the rate structure for the facility throughout the year, allowing the summer peak usage to inflate a facility's rate all year, not just during the summer. During recent years, the interest in thermal storage has increased based on the soaring cost of electricity, which has encouraged additional energy conservation measures. Many utilities have offered incentive programs and special rate structures to encourage cool storage use. In addition, cool storage technology has improved significantly since 1980, and designers and their clients continue to express a strong interest in the use of cool storage to reduce energy costs. This is due in part to the fact that by flattening out the demand curve for power, the power companies can improve their operating efficiency and avoid the construction of new generating plants to meet peak demands.

Several types of thermal storage are in use today. Chilled water storage is known and utilizes a large tank or reservoir of liquid that gets chilled at night by conventional air conditioning chillers. During the day, the water is circulated through the building or process that needs cooling. The water picks up heat at the load and is returned to the tank. The chilled water storage tanks can easily be multi-million gallon tanks, and in some instances the tank size can easily be larger than the building that it is cooling.

Ice storage is used since ice is able to storage more thermal energy (Btu's) in a much denser form. Ice can be used because of its latent heat content to store seven to ten times more Btu's per cubic foot than chilled water, which reduces the storage area or vessel size. One known method utilizes ice harvesting, in which an ice machine continuously makes cubes, slush or sheets of ice. The ice is stored in a tank, similar to the chilled water tank, but much smaller. As cooling is needed during the day, ice water can be drawn from the tank and pumped to the heat load. The warm water that returns from the load goes back to the ice tank to be cooled again. One problem with this type of ice thermal storage is the formation of large icebergs from the cubes, slush or sheets of ice in the tank that can be difficult to melt and which reduce the available surface area of the ice to absorb the heat load.

One method of preventing icebergs in the tank is to fill the tank with a multitude of sealed containers full of water. The containers can be loosely piled in the tank or neatly stacked such that they fill the tank and still have passages for a cooling medium to flow around them (usually a glycol anti-freeze solution). Air conditioning chillers modified to cool the cooling medium to sub-freezing temperatures are connected to the tank. As the cooling medium is circulated through the tank, the water in the containers freezes solid. For melt-out, the same cooling medium is circulated through the tank and to the heat load that needs cooling. However, due to the proprietary container designs needed for such systems, encapsulated ice systems can be very expensive. Additionally, the large volume of anti-freeze cooling medium can also add to the expense of such systems.

Ice-on-coil systems for thermal storage are also known. In these systems, a series of coils with widely spaced apart tubes is submerged in a tank of water. Cold (sub-freezing) anti-freeze solution is pumped from a specially modified chiller through the coil tubes during the ice build-up cycle. Ice forms as concentric cylinders on the surface of the tubes and can be built to a thickness of one to several inches. Using the geometry of the coil (careful tube placement) the ice build up can be kept very uniform. The ice is maintained in its proper place, and no icebergs are formed such that a maximum amount of ice surface area is exposed to the tank water at all times. The surface area of exposure is important to obtain maximum cooling during the melt out cycle.

In one known apparatus, the thermal storage equipment includes a cooling coil which carries a liquid refrigerant, such as brine or ethylene glycol solution, through a pool of freezable storage liquid, such as water. The pool of water, or the like, is confined within a vessel and the refrigerant coil, usually in the form of tubing bent into a serpentine path with a plurality of tube runs, is immersed in the pool. The refrigerant tubes are generally stacked in parallel within the pool and connected between inlet and outlet headers which receive and discharge the refrigerant liquid from and to one or more heat exchangers in which the refrigerant liquid is cooled during the ice storage cycle, and warmed during the cold supply cycle. The storage liquid is usually agitated during at least certain periods of operation to lessen temperature stratification.

There are two ways of extracting the cooling capacity from the stored ice; internal melt and external melt. With internal melt systems, the anti-freeze solution inside the coils is pumped to the cooling load where it picks up heat. When it returns to the coils, the warmed glycol is cooled by the melting ice on the tubes as the ice melts from the inside-out. External melt systems circulate the storage liquid from the tank to the heat load and return it to the tank to melt the ice off the tubes from the outside-in during periods of high demand on the cooling system.

A common enhancement to the performance of ice-on-coil systems during melt out is to agitate the tank water to expose as much tank water to as much ice surface area as possible. This provides cooling water at low temperatures, close to 32° F. A popular method of tank agitation is to use an air bubbler system. Low pressure air introduced to the bottom of the tank under the coils produces bubbles that rise up through coils and generate vertical currents of water. This agitation is desired because the typical circulation rate of tank water to and from the heat load is quite small compared to the volume of the tank and provides insignificant agitation to a large tank. Tank water agitation is useful on both external and internal melt systems. For internal melt systems, agitation is not much help during the initial part of the melt. However, after the initial phase of the melt cycle, the warmed melted ice (water) surrounding the tubes begins to break out through the ice cylinders. At that point, the ice will be melting internally and externally, and it is at that point agitation of the tank water improves the cooling process.

It is also known to provide thermal storage units in which the coils are frozen solid with ice during the build up cycle. While this provides a maximum amount of thermal storage in a specified volume, such systems are only useful for internal melt, and melt performance is hampered by a lack of agitation.

In order to increase the heat transfer efficiency between the ice and water circulated in the tank, it is known in the art to form ice on coils which are arranged as widely spaced serpentine tube circuits, connected by manifolds to inlet and outlet headers. Such systems typically use steel tubes ranging in size from ½ inch to 1¾ inches in diameter, and ice thickness can range from ½ inch to 2½ inches. In the known ice-on-coil systems, as shown in FIG. 1, which illustrates a portion of a coil through two serpentine circuits, the serpentine circuits consist of generally horizontal tubes 3 with 180° bends on the ends, with the tubes being arranged in generally vertically aligned rows which are horizontally spaced apart from adjacent circuits. In the known system of FIG. 1, the tubes 3 have an outside diameter of 1.05 inches, and are horizontally located apart by a dimension X of 3⅞ inches on center and vertically located apart by a dimension Y of 3⅞ inches on center. Ice envelopes 4 are formed to a thickness of approximately 1.4 inches such that the diameter of the ice envelopes 4 formed on each tube 3 is approximately 3⅞ inches.

In some cases, the tubes 3 are staggered vertically in a nesting effect to improve or create a clearance space or gap between the ice cylinders 4, as shown in FIG. 2. Using the same center-to-center dimensions X and Y and the same dimensions for the tube 3 and thickness of the ice 4 in FIG. 2 as in FIG. 1 results in a clearance gap of approximately 0.43 inches between the round cylinders of ice 4 in adjacent rows. Alternatively, this space is used to allow a certain amount of ice overbuild into the clearance gap. However, it is easy to see that any excessive overbuild will result in horizontal bridging which will quickly close out the clearance passages necessary for agitation and very quickly will reduce the surface area of the ice which is available for cooling. Once horizontal bridging occurs, melt out performance deteriorates and the large remaining icebergs become quite difficult to melt out.

Clearance spaces, while necessary, detract from packing efficiency of the coil. Packing efficiency is the ratio of the volume of ice actually formed and stored in comparison to the available space for frozen storage liquid around the coil assembly (excluding necessary clearance spaces designed for agitation). Since the cross-sections of the tubes and ice envelopes are generally constant, packing efficiencies can be calculated based on unit cross-sectional areas of the ice envelopes and the available area for frozen storage liquid to form. In systems in which horizontal bridging is not desired in order to allow agitation for more efficient melt out of the ice, the clearance gaps detract from the overall packing efficiency, since the vertical passageways remain unfrozen. Packing efficiency is maximized by filling the space around the tubes of the coil as fully as possible with ice, without leaving unfrozen areas within the confines of the potentially freezable areas. As shown in FIGS. 1 and 2 of the known systems, round cylinders of ice 4 formed on the tubes 3 of the cooling coil leave significant open spaces in the available space for frozen storage liquid around the coil assembly. In FIGS. 1 and 2, the ice packing efficiency is approximately 0.785 ($\pi/4$), since the potentially freezable area would be a square unit area which encompasses a cross-section of the cylindrical ice 4. This is about as efficient packing as possible with the current art shown in FIGS. 1 and 2 without the risk of overbuilding which would result in horizontal bridging and detract from cooling efficiency during melt out.

It is possible to reduce the vertical spacing between the tubes to form a smaller vertical gap between adjacent tube surfaces and allow a small amount of bridging in the vertical plane, as shown in FIG. 3, where Y is less than 3⅞ inches and the remaining dimensions are the same as in FIGS. 1 and 2. When this is done, the packing efficiency can be greater than 0.785. It is known to reduce this vertical spacing in order to encourage bridging in the vertical direction while still leaving horizontal gaps to leave vertical passageways and prevent horizontal bridging which reduces overall cooling efficiency. The result of this vertical bridging is to form vertical slabs of ice with vertically oriented clearance spaces between the vertical rows of tubes for tank water circulation. The generally vertical orientation of the spaces is important for the bubbler agitation to work.

In calculating packing efficiency, it is important to note that if the quantity of ice is calculated based upon ice thickness, then the areas of overlap 5 due to vertical bridging would be counted twice (once for ice around the upper tube in the overlap area 5 and once for ice around the lower tube in the overlap area 5), indicating a deceptively high amount of ice in storage. However, in fact, what happens is that the ice tends to build up in the areas of intersection 6 adjacent the overlap areas 5 and it has been shown to make up for the double counted areas. See FIG. 3. For the purposes of this disclosure, packing efficiency has been calculated without counting the overlap areas twice. Additionally, the overbuild of ice in the areas of intersections was not counted since it is difficult to predict, and the agitation space between adjacent vertical rows has not been included. As a result, all packing efficiency calculations herein for a single vertical row are conservative, and the effects in actual practice will be greater than shown here. Of course, putting the tubes of the coil closer together vertically has limits. Eventually, the increases in efficiency become more and more costly. When additional tubes are added, they take up additional space in the coil that could be occupied by ice. There is also a limited ability of manufacturers to make smaller, tighter return bends for connecting the tubes together.

All of the known ice-on coil thermal storage units utilize tubes with a round cross-section. The present invention provides for higher packing efficiency without undesired horizontal bridging in order to provide an improved thermal storage apparatus.

BRIEF SUMMARY OF THE INVENTION

Briefly stated, one aspect of the present invention relates to an increased capacity thermal storage apparatus for forming frozen storage liquid during a storage cycle. The apparatus comprises a container for holding a pool of storage liquid. A coil assembly having a plurality of tubes is immersed in the pool storage liquid. The tubes are adapted to transport a refrigerant therethrough to create an envelope of frozen storage liquid around each of the tubes during the storage cycle. Each tube has a non-circular cross-section with a horizontal dimension and a vertical dimension. The vertical dimension is greater than or equal to the horizontal dimension. The tubes are oriented generally horizontally and are arranged in a plurality of spaced apart, generally vertical rows with neighboring tubes in adjacent vertical rows being horizontally spaced apart sufficiently such that unfrozen, generally vertical passageways remain between the envelopes of frozen storage liquid. The envelope of frozen storage liquid on each tube conforms to the non-circular cross-section of the tube to increase packing efficiency of the frozen storage liquid per unit volume of available space for frozen storage liquid around the coil assembly.

In another aspect, the invention relates to an improved coil assembly for a thermal storage apparatus. The coil assembly includes a plurality of tubes adapted to be connected to a refrigerant source and immersed in a pool of storage liquid. Each tube has a non-circular cross-section with a horizontal dimension and a vertical dimension. The vertical dimension is greater than or equal to the horizontal dimension. The tubes are oriented generally horizontally and are arranged in a plurality of spaced apart, generally vertical rows, such that an envelope of frozen storage liquid is adapted to form on and have a non-circular cross-section conforming to the tube to increase packing efficiency of the frozen storage liquid per unit volume of available space for frozen storage liquid around the coil assembly.

In another aspect, the present invention relates to a method for storing thermal energy. The method comprises:

placing a freezable liquid in a container;

placing a cooling coil assembly in the container, the cooling coil assembly including a plurality of tubes, each tube having a non-circular cross-section with a horizontal dimension and a vertical dimension, the vertical dimension being greater than or equal to the horizontal dimension, the tubes being oriented generally horizontally and being arranged in a plurality of spaced apart, generally vertical rows, with neighboring tubes in adjacent vertical rows being horizontally spaced apart sufficiently such that unfrozen, generally vertical passageways remain between the envelopes of frozen storage liquid;

passing a refrigerant through the tubes to create an envelope of frozen storage liquid around each tube during a storage cycle, the envelope of frozen storage liquid on each tube conforming to the non-circular cross-section of the tube to increase packing efficiency of the frozen storage liquid per unit volume of available space for frozen storage liquid around the coil assembly, and forming vertical bridging of storage liquid between the envelopes of frozen storage liquid on adjacent tubes in the vertical rows;

extracting thermal energy in the form of cooling from the frozen storage liquid during a usage cycle; and passing storage liquid vertically between the envelopes of frozen storage liquid of adjacent vertical rows to increase heat transfer efficiency.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
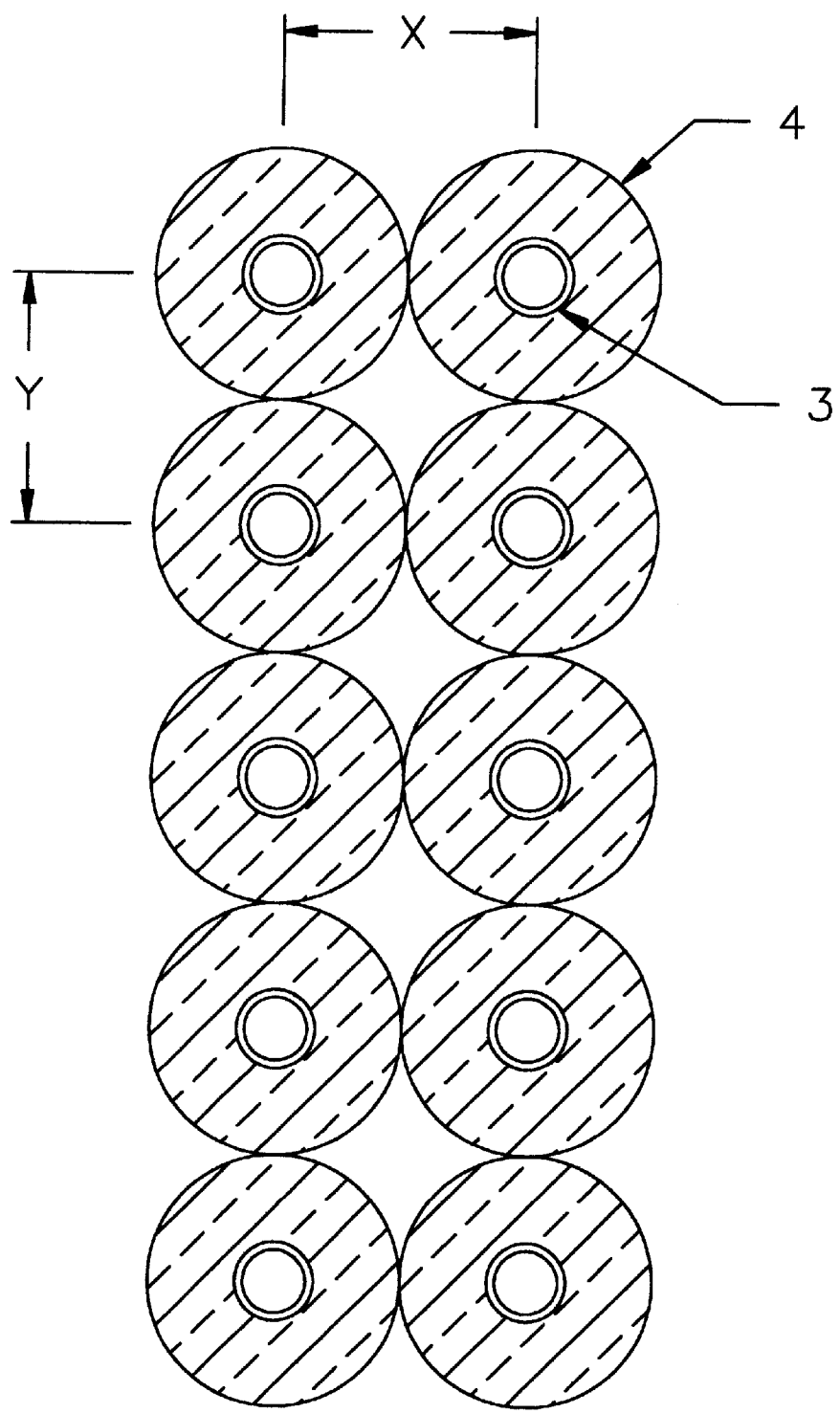
FIG. 1 is cross-sectional view of a portion of an ice-on-coil thermal storage arrangement in accordance with the prior art.
Figure 2:
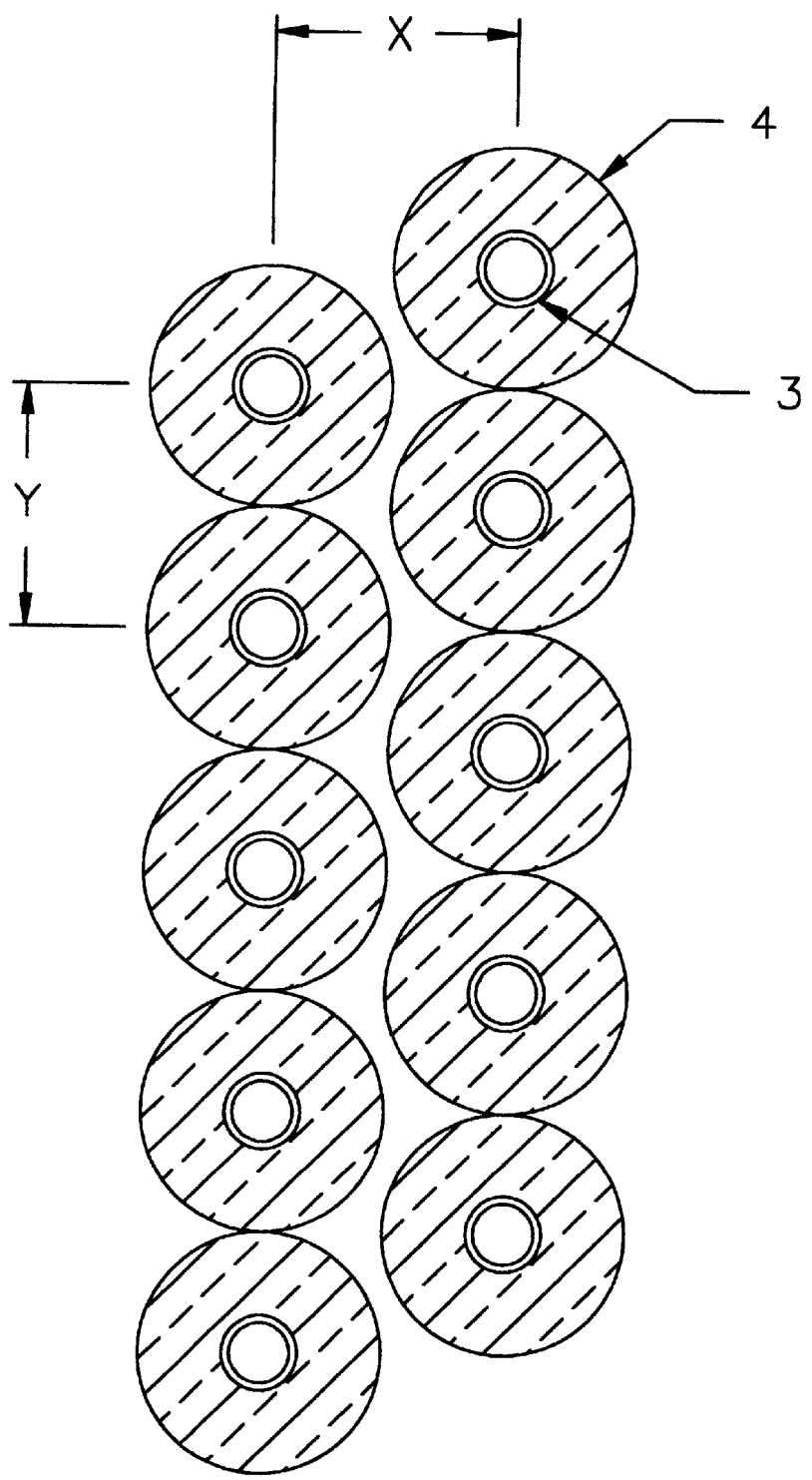
FIG. 2 is a cross-sectional view similar to FIG. 1 of a portion of another ice-on-coil thermal storage apparatus in accordance with the prior art.
Figure 3:
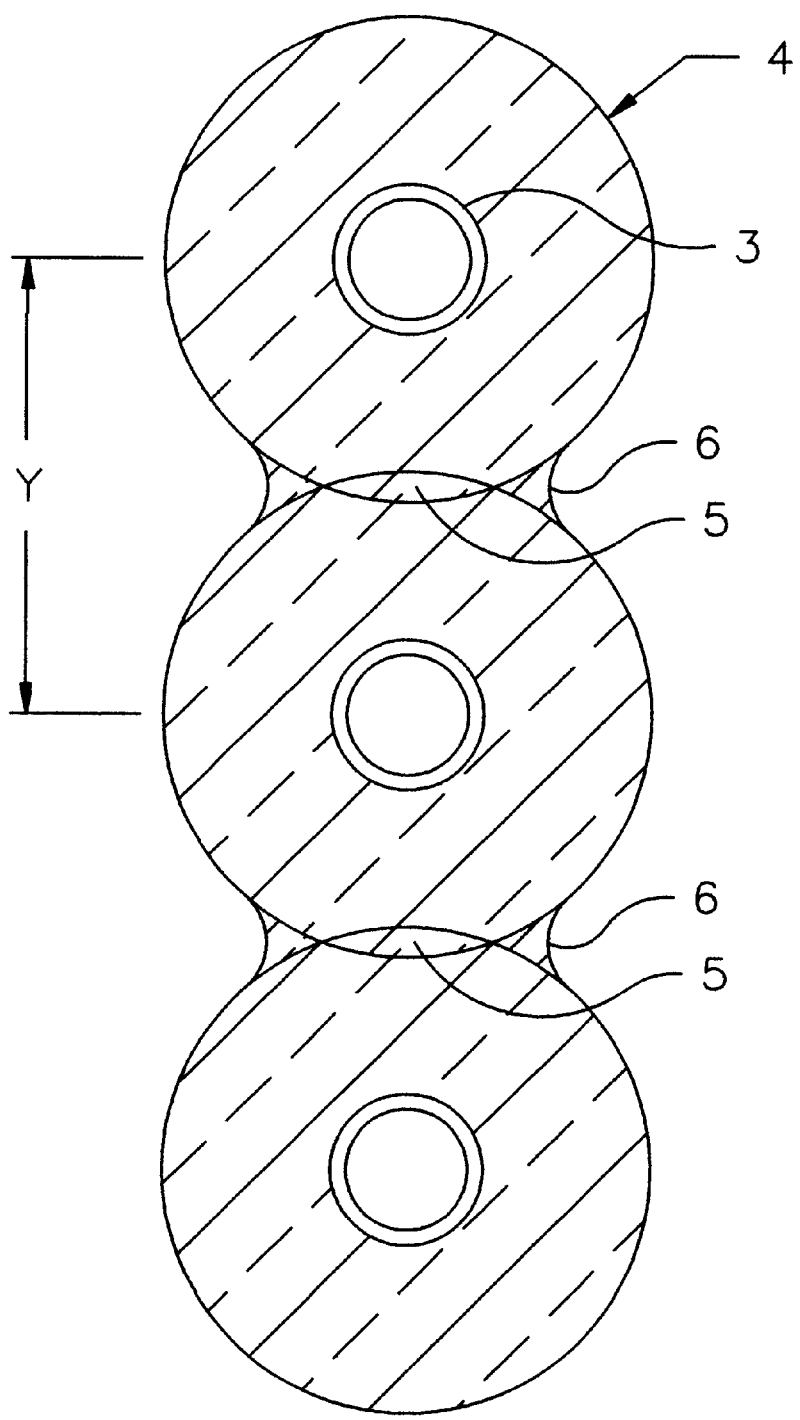
FIG. 3 is an enlarged partial, cross-sectional view similar to FIGS. 1 and 2 showing formation of ice on another prior art ice-on-coil thermal storage apparatus, with vertical bridging between the ice envelopes formed on the coil tubes.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the cooling system 1, and designated parts thereof. The terminology includes the words specifically mentioned above, derivatives thereof and words of similar import.

Figure 5:
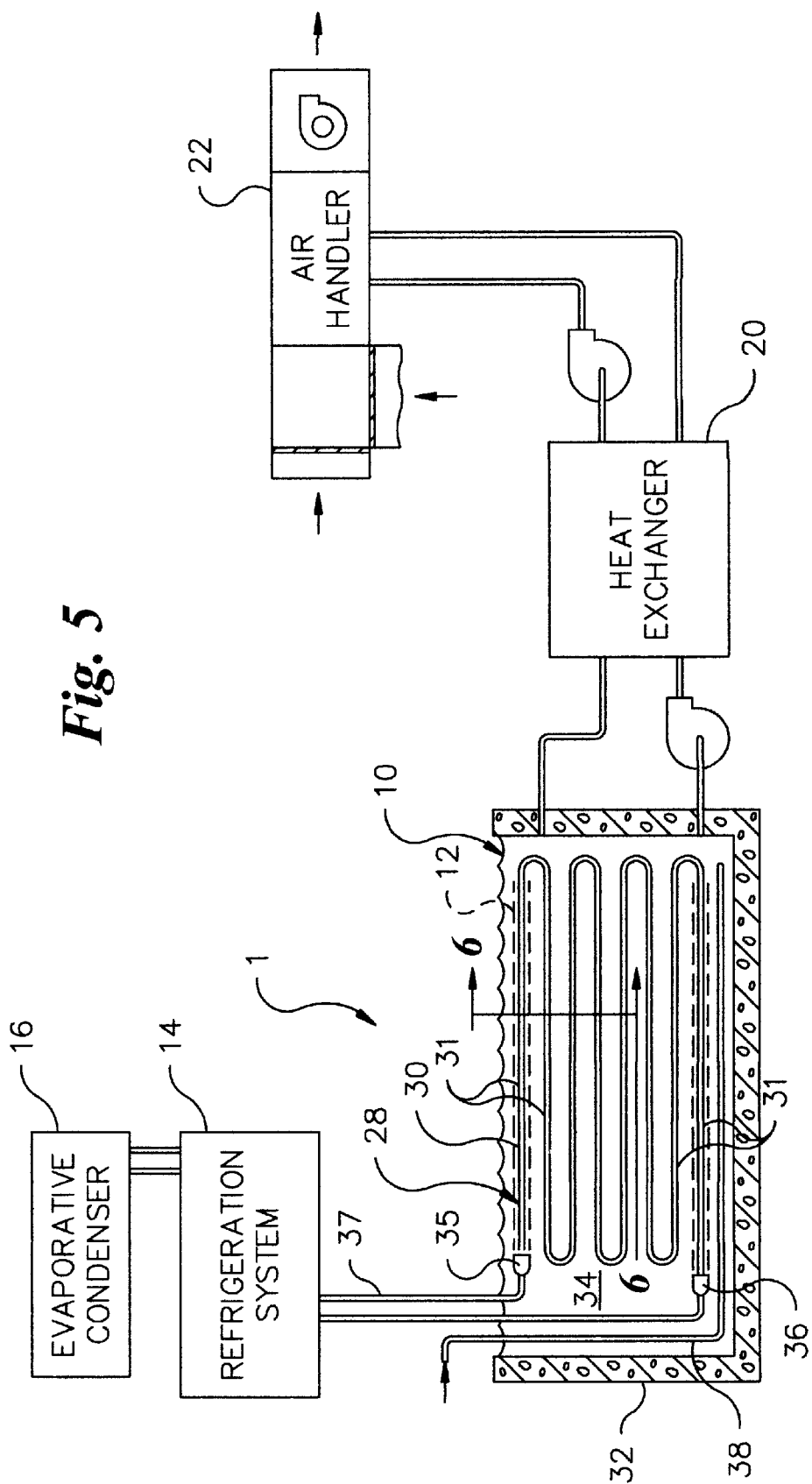
FIG. 5 is a schematic diagram of a cooling system utilizing an increased capacity thermal storage apparatus in accordance with the present invention.

Referring to FIG. 5 of the drawings, a cooling system 1 having an increased capacity thermal storage apparatus 10 for forming frozen storage liquid 12 during a storage cycle is shown. The cooling system 1 preferably includes the following components: the thermal storage apparatus 10, a refrigeration system 14 which may include a refrigeration compressor or chiller for an anti-freeze solution such as ethylene glycol or other known anti-freeze solutions with an evaporative condenser or cooling tower 16, a heat exchanger 20, and an air handler portion 22 of a cooling system. Such systems are generally known to those of skill in the art, and accordingly a detailed description of these components has not been provided. The present invention is directed to improvements in the thermal storage apparatus 10 of the system 1.

Still with reference to FIG. 5, the increased capacity thermal storage apparatus 10 includes a container 32, preferably in the form of a concrete basin for holding a pool of storage liquid 34. A coil assembly 28, which preferably includes a plurality of tubes 31, is immersed in the pool of storage liquid 34. The tubes 31 of the coil assembly 28 are preferably connected between an inlet header 35 and an outlet header 36. The tubes 31 are adapted to transport a refrigerant therethrough from the refrigeration system 14 via pipes 37. During a thermal storage cycle, an envelope of frozen storage liquid 12, which has been represented in dashed lines on only the upper and lower tubes 31 in FIG. 5, is created around each of the tubes 31.

Preferably, the coil assembly 28 is formed by a plurality of separate coils 30 which are located adjacent to each other and are connected between the inlet and outlet headers 35, 36, with each coil 30 including a plurality of the tube 31 arranged in a generally vertical row. The coils 30 may be formed from a single piece of piping having a number of 180° bends, or may be formed from a plurality of pipe segments which are joined together in a coil arrangement. It will be recognized by those skilled in the art from the present disclosure that the coil 30 of coil assembly 28 may be produced by a number of different methods. It will be similarly recognized by those skilled in the art that the refrigerant flow in adjacent coils 30 may be parallel (same direction) or in a counter flow direction through the use of additional inlet and outlet headers and connector arrangements which are generally known. A counter flow arrangement can further improve packing efficiency because, in actuality, the frozen storage liquid 12 is thicker on the coil 30 in the area adjacent to the inlet header 35 than the outlet header 36 due to the transfer of energy from the storage liquid 34 to the refrigerant as it passes through each coil 30. Providing a counterflow of refrigerant in neighboring coils 30 locates the thicker frozen storage liquid 12 on one coil 30 adjacent to the thinner frozen storage liquid 12 of the adjacent coils 30. It will also be recognized that a similar counterflow can be provided utilizing other coil arrangements, such as a single coil which has two adjacent generally vertical rows of tubes with the inlet and outlet being located adjacent to each other.

Frozen storage liquid 12 is produced from the storage liquid 34, typically but not exclusively water, in the ice storage basin 32 in off peak periods when little or no comfort or processing cooling is required. During periods of cooling demand, thermal energy is extracted from the frozen storage liquid 12 by circulating warm building return storage liquid 34 through the ice storage basin 32 either directly or through a heat exchanger 20, as shown. The storage liquid 34 is agitated during this phase to facilitate uniform ice melting via an air bubbler system 38. This provides a constant low temperature water supply to economically satisfy the comfort or process cooling requirements for a particular use.

Figure 6:
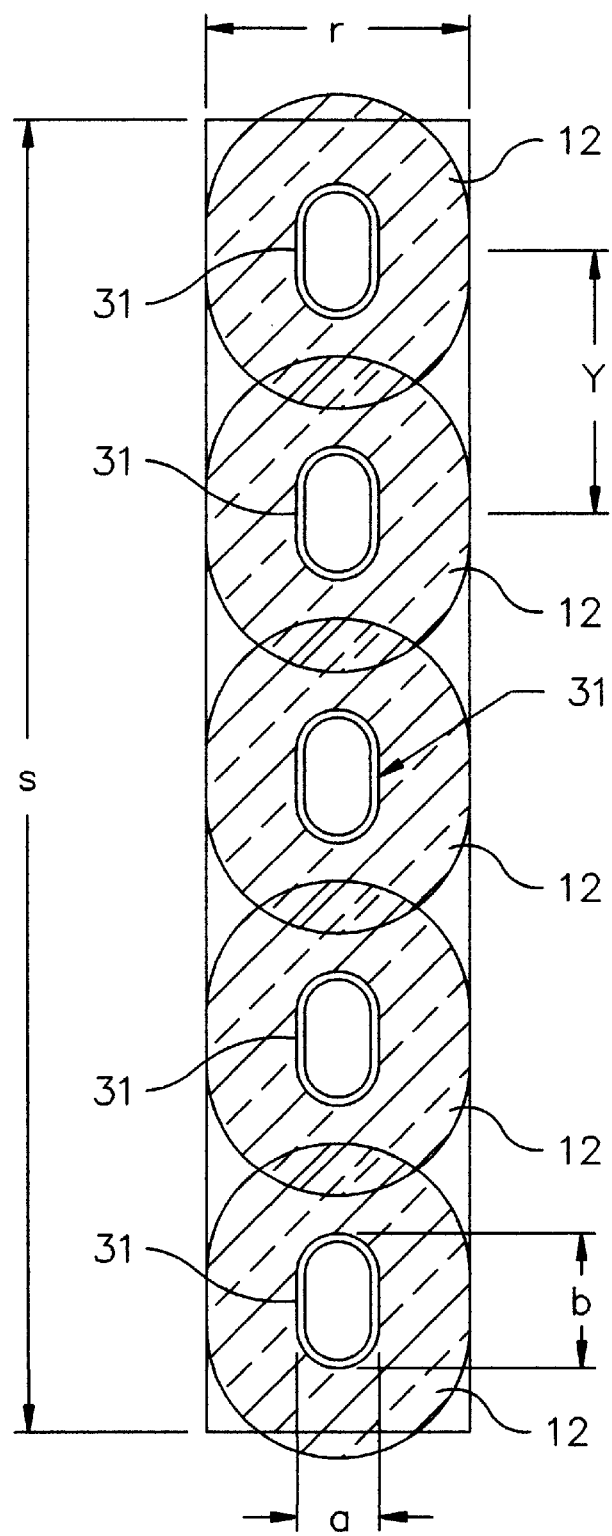
FIG. 6 is a unit cross-section similar to FIG. 4 taken along lines 6—6 in FIG. 5 of a first embodiment of a tube arrangement of an increased capacity thermal storage apparatus in accordance with the present invention having the same defined cross-sectional unit area as shown in FIG. 4.

Referring now to FIG. 6, the tubes 31 in accordance with a first preferred embodiment of the increased capacity thermal storage apparatus 10 are shown in detail. Each tube 31 has a non-circular cross-section with a horizontal dimension "a" and a vertical dimension "b". The vertical dimension "b" is greater than or equal to the horizontal dimension "a". In the first preferred embodiment, the tubes 31 are oval. Preferably, by way of a specific, non-limiting example, the oval tubes 31 have a vertical dimension "b" of 1.31 inches and a horizontal dimension "a" of approximately 0.75 inch to provide a cross-sectional area which is approximately equal to the 1.05 inches diameter tube 3 with a circular cross-section in accordance with the prior art, as shown in FIGS. 1–4. The dimensions "a" and "b" can be varied depending upon the particular application. The tubes 31 are oriented generally horizontally and are arranged in a plurality of spaced apart, generally vertical rows (not shown). Neighboring tubes 31 in adjacent vertical rows are horizontally spaced apart sufficiently such that unfrozen, generally vertical passageways remain between the envelopes of frozen storage liquid 12. Preferably, the gap between the outer surfaces of neighboring tubes 31 in a generally horizontal direction is greater than two times the desired ice thickness such that the generally unfrozen vertical passageways remain between the envelopes of frozen storage liquid 12. The gap between adjacent vertical tubes 31 is preferably less than the gap between adjacent horizontal tubes 31 in order to provide vertical bridging. This result can be easily accomplished for non-circular tubes 31 having a horizontal dimension "a" which is less than or equal to the vertical dimension "b" utilizing uniform spacing, or can be accomplished, for example, by adjusting the center to center spacing dimensions X and Y using the same dimensions X and Y as noted above in connection with the prior art in FIGS. 1–4.

The increased packing efficiency which is accomplished by the present invention is a result of the surprising discovery that the envelope of frozen storage liquid 12 on each tube 31 conforms to the non-circular cross-section of the tube 31 for the thicknesses of frozen storage liquid 12 desired. This was unexpectedly discovered in the course of attempting to improve the ice-on-coil thermal storage apparatus 10. While it was expected that the frozen envelope around the tubes 31 would quickly circularize, testing found that the frozen storage liquid or ice 12 which formed around the tubes 31 conformed to the underlying shape of the tube 31 substantially for the full thickness of ice being generated in the systems in accordance with the present invention, with the frozen storage liquid 12 having the same general shape as the underlying pipe 31 with some rounding off (particularly at the corners of the square and rectangular embodiments discussed below). This permits an increase in packing efficiency of the frozen storage liquid 12 per unit volume of available space for frozen storage liquid around the coil assembly 28. For such systems generally utilizing tubes having an exemplary cross-sectional area which is approximately equal to the area of a ½ to 1¾ inch diameter tube, a system of this invention can generate an ice envelope approximately ½ to 2½ inches thick. Because of this phenomenon, the use of shaped tubes 31 allows the formation of shaped ice 12 that increases the packing efficiency of the coil assembly 28

To demonstrate the benefits of the present invention, packing efficiencies of the prior art round tubes will be compared with those of tubes used in this invention.

Figure 4:
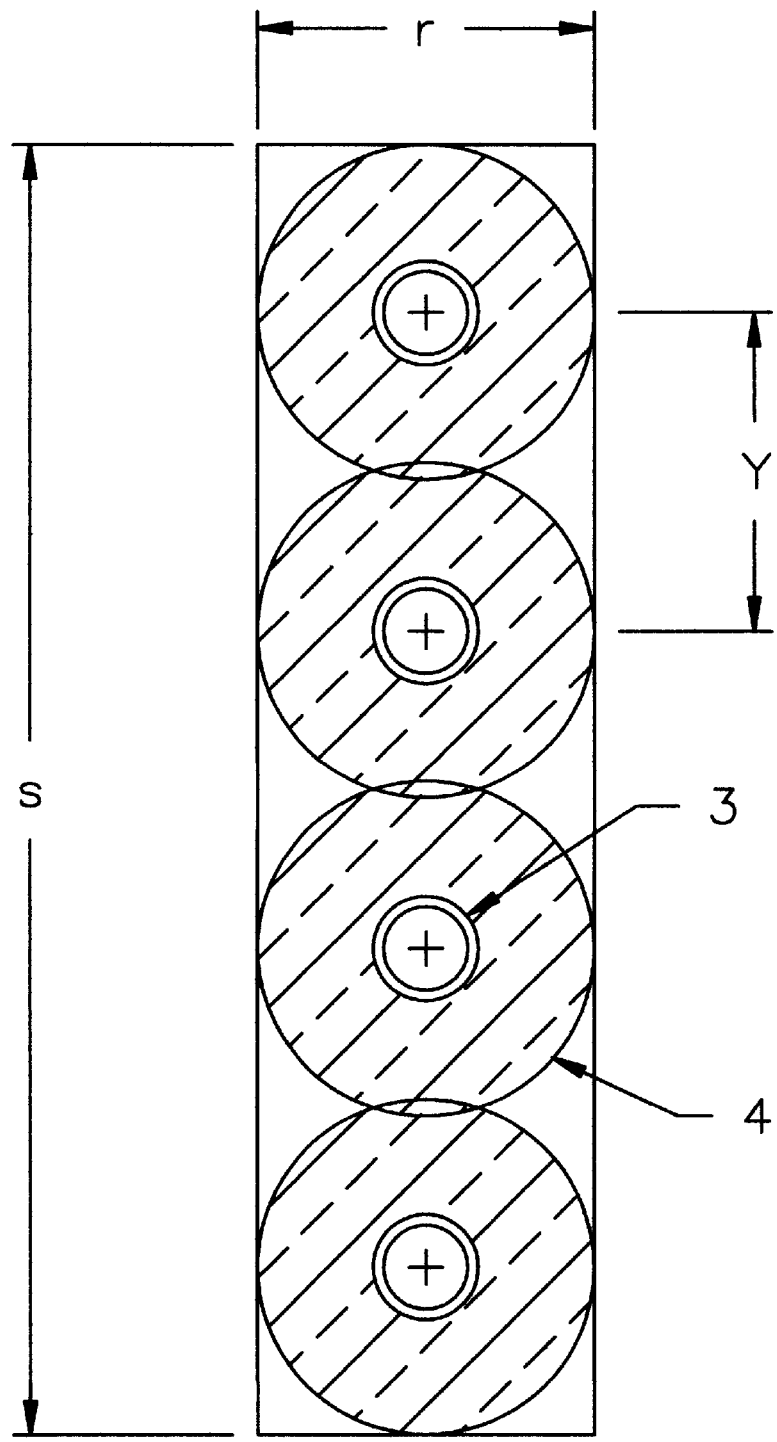
FIG. 4 is a vertical cross-section having a defined cross-sectional unit area through a portion of a coil of a thermal storage apparatus in accordance with the prior art.

A conventional round tube coil configuration is shown in FIG. 4 which includes tubes 3 with a diameter of 1.05 inches having an exemplary vertical center-to-center spacing Y of 3¾ inches with ice diameters equal to 3⅞ inches. These dimensions allow a slight amount of vertical bridging for an ice envelope of approximately 1.4 inches in thickness. Packing efficiency for this arrangement is based on a cross-sectional unit rectangular shape which encompasses the tubular ice 4 formed on a row of tubes 3. In this case, the shape is a rectangle having a horizontal dimension "r" of approximately 3⅞ inches and a vertical dimension "s" of approximately 18⅞ inches. Based upon the actual area of the ice envelope as shown, including bridging, the efficiency of packing (i.e., the cross-sectional area of the ice formed in comparison to a theoretical maximum provided by the rectangular enclosure) is approximately 0.802 (80.2%). This is only approximately 2% better than the theoretical value of 0.785 (78.5%).

Referring to FIG. 6, the packing efficiency using the same calculation as for FIG. 4 was determined for the oval tubes 31 in accordance with the present invention. An oval is a shape that has parallel straight sides and generally semi-circular or rounded off ends. An ellipse is a shape that is curved on all sides—known in geometry as a conic section. In general, the two shapes can be very similar. An oval is chosen for this example because the areas and overlap intersections are easier to calculate. However, it will be shown below that what is true for the oval is also true for an ellipse.

Referring again to FIG. 6, an oval having a horizontal dimension "a" of 0.75 inch was selected. In order to provide the same area as a 1.05 inch diameter round tube, an overall vertical dimension "b" of 1.316 inches was selected. Five oval tubes 31 were placed in the same 3⅞ by 18⅞ inch rectangle using the same center-to-center locations as the tubes in FIG. 4. Not counting the areas of ice which form outside the rectangle at the top and bottom, the efficiency of packing is 0.889 (88.9%). This is 10.9% better than the round tubes discussed in the above example and as shown in FIG. 4 and approximately 13.2% better than the theoretical value of 0.785 (78.5%). This can observed by looking at the differences between FIGS. 4 and 6. It has been found that the taller and thinner the tube shape, the higher the packing efficiency which can be achieved.

Figure 7:
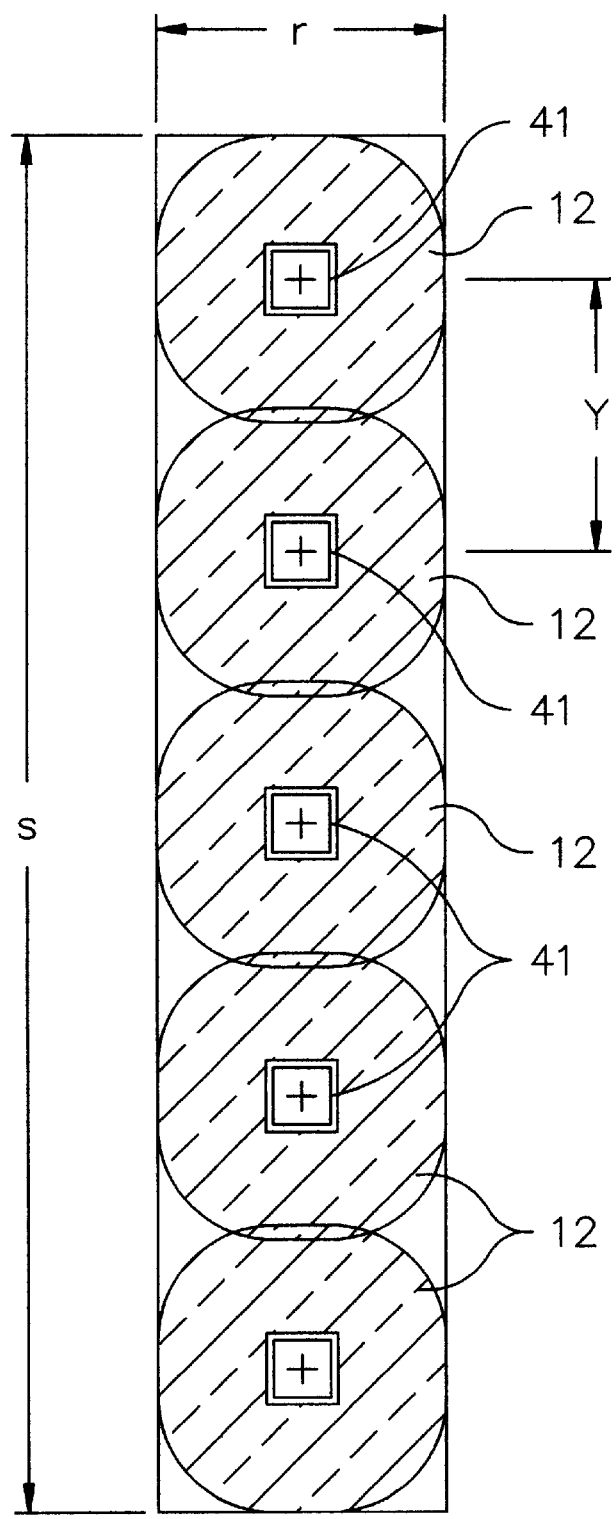
FIG. 7 is a unit cross-section of a second embodiment of a tube arrangement for an increased capacity thermal storage apparatus in accordance with the present invention having the same defined cross-sectional unit area as shown in FIG. 4.
Figure 8:
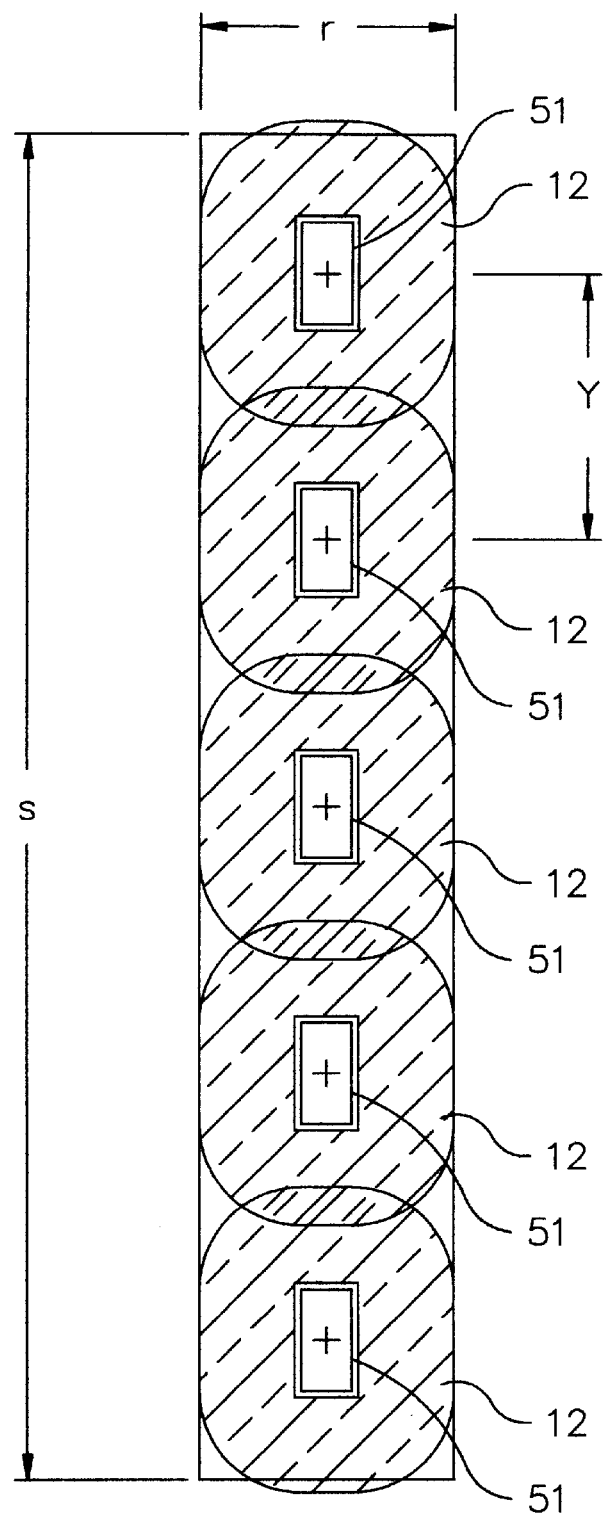
FIG. 8 is a unit cross-section of a third embodiment of a tube arrangement for an increased capacity thermal storage apparatus in accordance with the present invention having the same defined cross-sectional unit area as shown in FIG. 4.
Figure 9:
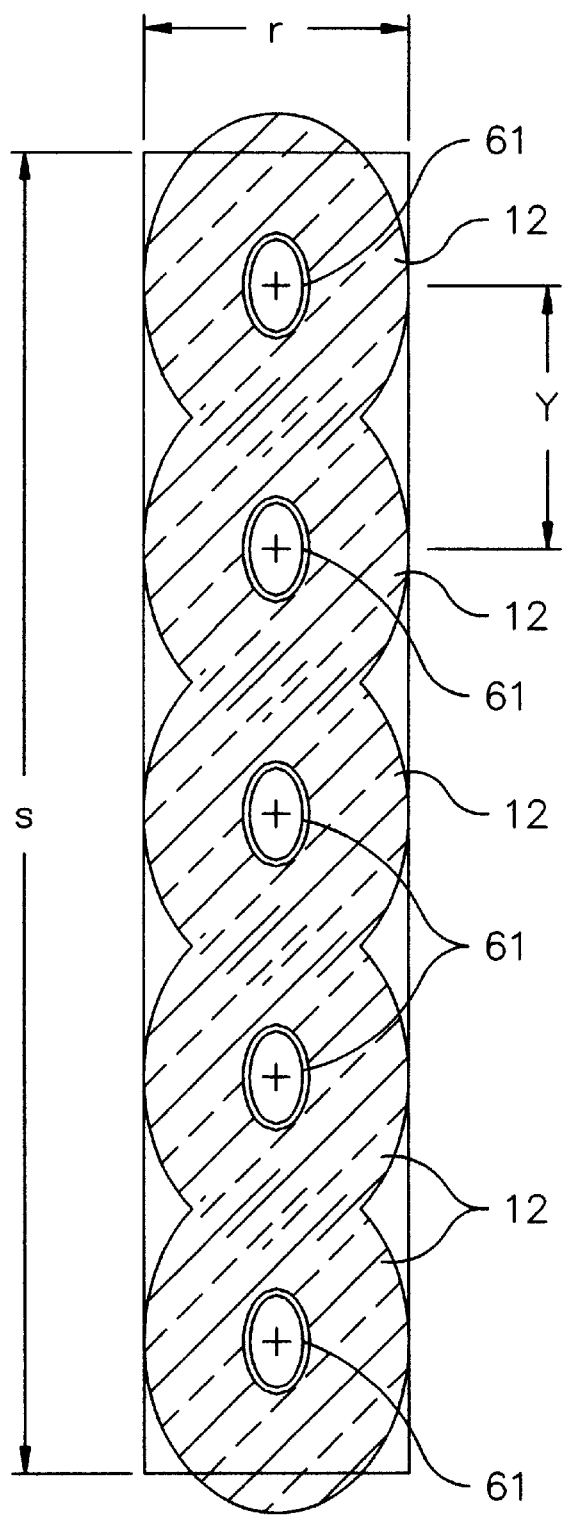
FIG. 9 is a unit cross-section of a fourth embodiment of a tube arrangement for an increased capacity thermal storage apparatus in accordance with the present invention having the same defined cross-sectional unit area as shown in FIG. 4.

Referring now to FIGS. 7–9, tubes 41, 51 and 61 in accordance with the second, third and fourth embodiments of the present invention are shown. These tubes 41, 51, and 61 can be used in the improved thermal storage apparatus 10 in the same manner as the tubes 31. The tubes 41 shown in FIG. 7 are generally 0.931 inch square tubes in order to provide the same cross-sectional area as the 1.05 inches diameter round tube 3 evaluated above with respect to the prior art arrangement of FIG. 4. Five square tubes 41 were placed in the same rectangular unit area 3⅞ inches wide by 18⅞ inches high with the same center-to-center vertical spacing as the round tubes 3 shown in FIG. 4. The efficiency of packing for this arrangement was found to be 0.887 (88.7%) which is 10.6% better than the round tube example discussed above and 13.0% better than the theoretical value of 0.785 (78.5%).

Referring to FIG. 8, the tubes 51 in accordance with the third embodiment of the invention are shown. The tubes 51 have a rectangular cross-section. The tubes 51 preferably have a width of 0.75 inch and a height of approximately of 1.155 inches to provide a cross-sectional area that is equal to that of the 1.05 inches diameter tube 3 shown in FIG. 4. Five tubes 51 having a rectangular cross-section were placed within the same rectangular unit area 3⅞ inches wide by 18⅞ inches high with the same center-to-center vertical spacing as the round tubes 3 shown in FIG. 4. Not counting the areas outside the rectangle at the top and bottom, the packing efficiency is 0.872 (87.2%). This is 8.8% better than the round tubes known in the prior art, as shown in FIG. 4, and provides a 11.1% improvement over the theoretical value of 0.785 (78.5%).

Referring now to FIG. 9, tubes 61 having an elliptical cross-section with a major axis of 1.25 inches and a minor axis of 0.85 inch are provided. Five tubes 61 having an elliptical cross-section were placed within the same rectangular unit area 3⅞ inches wide by 18⅞ inches high with the same spacing as the round tubes 3 shown in FIG. 4. Not counting areas outside the rectangle at the top and bottom, the efficiency of packing is 0.853 (85.3%). This is 6.4% better than the round tube known in the prior art as shown in FIG. 4 and 8.7% better than the theoretical value of 0.785 (78.5%).

While the use of an elliptical tube 61 may result in a smaller increase in packing efficiency than the oval, square and rectangular tubes 31, 41, 51, there are several advantages to the use of elliptical tubes from both a design and a producibility stand point. The elliptical tubes are easier to form and it is also easier to make the 180° return bends than in square or rectangular tubes 41, 51. Additionally, the rounded sides are able to withstand higher internal pressures for a given tube wall thickness than square or rectangular tube shapes. However, it will be recognized by those skilled in the art from the present disclosure that any non-circular tube shape having a vertical dimension "b" which is greater than or equal to the horizontal dimension "a" can be used and will provide an increase in packing efficiency over the known circular tubes.

It can seen that by utilizing tubes 31, 41, 51, 61 in accordance with the present invention, an improved coil for a thermal storage apparatus is provided. It has been found that high efficiencies can be achieved by utilizing taller and thinner tube shapes such as the rectangular tubes 51 or the oval or elliptical tubes 31, 61. In use, a refrigerant is passed through the tubes 31, 41, 51, 61 to create a tubular envelope of frozen storage liquid 12 around each of the tubes during a storage cycle. The envelope of frozen storage liquid 12 on each tube conforms to the non-circular, cross-section of the tube 31, 41, 51, 61 to increase packing efficiency of the frozen storage liquid 12 per unit volume of available space for frozen storage liquid around the coil assembly 28 from that known in the prior art round tube coils. Vertical bridging is formed between the envelopes of frozen storage liquid 12 on adjacent tubes 31, 41, 51, 61 in the vertical rows, as shown in FIGS. 6–9. Preferably, horizontal gaps which form vertical passageways are left between the generally vertically bridged envelopes 12 in order to allow for agitation of the pool of storage liquid 34 in order to increase heat transfer efficiency by passing the storage liquid vertically between the envelopes of frozen storage liquid 12 of adjacent vertical rows.

In the preferred embodiment, the tubes 31, 41, 51, 61 are manufactured from high quality steel and are bent into coils and connected to the inlet and outlet manifolds 35, 36. To protect the coils against corrosion, preferably, they are hot dipped galvanized in molten zinc after being assembled in a heavy steel frame. However, it will be recognized that the tubes 31, 41, 51, 61 may be made from other suitable metallic or polymeric materials, if desired. It will be similarly recognized that the tubes 31, 41, 51, 61 may be provided as a single piece that is bent into a coil 30 of coil assembly 28, or may be joined together in sections by connectors.

This type of system allows more thermal storage to be provided within a given size container or basin 32 from a given coil arrangement, simply by changing the tube geometry. Additionally, these types of systems allow the use of a smaller refrigeration system 14, providing reduced cost of operation. Additional savings are also obtainable through reductions in pipe, duct work and wiring sizes which further offset the cost of the thermal storage equipment. It will be recognized by those skilled in the art from present disclosure that the coils 30 may be provided with differing numbers of tubes 31, 41, 51, 61 in any desired sizes having lengths, widths and heights which are determined by the needs for a given application and to meet a given container or basin 32 configuration. It will be similarly recognized that these improved coils are not limited to use with the external melt system described above, but can also be used in internal melt systems.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An increased capacity thermal storage apparatus for forming frozen storage liquid during a storage cycle, comprising:

a container for holding a pool of storage liquid;

a coil assembly having a plurality of tubes immersed in the pool of storage liquid, the tubes being adapted to transport a refrigerant therethrough to create an envelope of frozen storage liquid around each of the tubes during the storage cycle, each tube having a non-circular cross-section with a horizontal dimension and a vertical dimension, the vertical dimension being greater than or equal to the horizontal dimension, the tubes being oriented generally horizontally and being arranged in a plurality of spaced apart, generally vertical rows, with neighboring tubes in adjacent vertical rows being horizontally spaced apart sufficiently such that unfrozen, generally vertical passageways remain between the envelopes of frozen storage liquid, the envelope of frozen storage liquid on each tube conforms to the non-circular cross-section of the tube, the increased capacity corresponding to an increased packing efficiency of the frozen storage liquid per unit volume of available space for frozen storage liquid around the coil assembly compared to a packing efficiency of the frozen storage liquid around an otherwise comparable coil assembly of tubes having a circular cross-section of the same cross-sectional area as the tubes having a non-circular cross-section.

2. The apparatus of claim 1 wherein the tubes have a square cross-section.

3. The apparatus of claim 1 wherein the vertical dimension of the tubes is greater than the horizontal dimension of the tubes.

4. The apparatus of claim 3 wherein the tubes have an oval cross-section.

5. The apparatus of claim 3 wherein the tubes have an elliptical cross-section.

6. The apparatus of claim 3 wherein the tubes have a rectangular cross-section.

7. An improved coil assembly for a thermal storage apparatus, the coil assembly comprising:

a plurality of tubes adapted to be connected to a refrigerant source and immersed in a pool of storage liquid, each tube having a non-circular cross-section with a horizontal dimension and a vertical dimension, the vertical dimension being greater than or equal to the horizontal dimension, the tubes being oriented generally horizontally and being arranged in a plurality of spaced apart, generally vertical rows, such that an envelope of frozen storage liquid is adapted to form on and have a non-circular cross-section conforming to the tube to increase packing efficiency of the frozen storage liquid per unit volume of available space for frozen storage liquid around the coil assembly, wherein neighboring tubes in adjacent vertical rows are horizontally spaced apart sufficiently such that unfrozen, generally vertical passageways remain between the envelopes of frozen storage liquid, the increased packing efficiency being determined compared to a packing efficiency of the frozen storage liquid around an otherwise comparable coil assembly of tubes having a circular cross-section of the same cross-sectional area as the tubes having a non-circular cross-section.

8. The improved coil assembly of claim 7 wherein the tubes have a square cross-section.

9. The coil assembly of claim 7 wherein the vertical dimension of the tubes is greater than the horizontal dimension of the tubes.

10. The improved coil assembly of claim 9 wherein the tubes have an oval cross-section.

11. The improved coil assembly of claim 9 wherein the tubes have an elliptical cross-section.

12. The improved coil assembly of claim 9 wherein the tubes have a rectangular cross-section.

13. A method for storing thermal energy comprising:

placing a freezable liquid in a container;

placing a cooling coil assembly in the container, the cooling coil assembly including a plurality of tubes, each tube having a non-circular cross-section with a horizontal dimension and a vertical dimension, the vertical dimension being greater than or equal to the horizontal dimension, the tubes being oriented generally horizontally and being arranged in a plurality of spaced apart, generally vertical rows, with neighboring tubes in adjacent vertical rows being horizontally spaced apart sufficiently such that unfrozen, generally vertical passageways remain between the envelopes of frozen storage liquid;

passing a refrigerant through the tubes to create an envelope of frozen storage liquid around each tube during a storage cycle, the envelope of frozen storage liquid on each tube conforming to the non-circular cross-section of the tube to increase packing efficiency of the frozen storage liquid per unit volume of available space for frozen storage liquid around the coil assembly, and forming vertical bridging of storage liquid between the envelopes of frozen storage liquid on adjacent tubes in the vertical rows;

extracting thermal energy in the form of cooling from the frozen storage liquid during a usage cycle; and passing storage liquid vertically between the envelopes of frozen storage liquid of adjacent vertical rows to increase heat transfer efficiency compared to the heat transfer efficiency of a method using an otherwise comparable coil assembly of tubes having a circular cross-section of the same cross-sectional area as the tubes having a non-circular cross-section.

14. The method of claim 13 wherein the tubes have a square cross-section.

15. The method of claim 13 wherein the vertical dimension of the tubes is greater than the horizontal dimension of the tubes.

16. The method of claim 15 wherein the tubes have an oval cross-section.

17. The method of claim 15 wherein the tubes have an elliptical cross-section.

18. The method of claim 15 wherein the tubes have a rectangular cross-section.

* * * * *